United States Patent [19]

Iceland

[11] Patent Number: 4,766,286
[45] Date of Patent: Aug. 23, 1988

[54] ARC LENGTH CONTROL FOR PLASMA WELDING

[75] Inventor: William F. Iceland, Los Alamitos, Calif.

[73] Assignee: United States of America as represented by the Administrator of the National Aeronautics and Space Administration, Washington, D.C.

[21] Appl. No.: 79,317

[22] Filed: Jul. 30, 1987

[51] Int. Cl.$^4$ .............................................. B23K 9/00
[52] U.S. Cl. ........................... 219/121.57; 219/124.02; 219/130.4; 219/121.54; 219/121.56
[58] Field of Search ....................... 219/124.02, 124.03, 219/130.4, 121 PT, 121 PU, 121 PX, 121 PV, 121 PM, 75; 313/231.31, 231.41, 231.51

[56] References Cited

U.S. PATENT DOCUMENTS

| | | | |
|---|---|---|---|
| 3,236,997 | 2/1966 | Johnson et al. | 219/124.03 |
| 3,562,581 | 3/1968 | Sonju | 219/121 PW |
| 4,017,707 | 4/1977 | Brown et al. | 219/121 P |
| 4,101,754 | 7/1978 | Fischer | 219/124.03 |
| 4,170,727 | 10/1979 | Wilkins | 219/121 PT |
| 4,324,971 | 4/1982 | Frappier | 219/121 PV |
| 4,678,888 | 7/1987 | Camacho et al. | 219/121 PW |
| 4,682,004 | 7/1987 | Schmall | 219/121 PT |

*Primary Examiner*—M. H. Paschall
*Attorney, Agent, or Firm*—Edward K. Fein; John R. Manning; Russell E. Schlorff

[57] ABSTRACT

For use with plasma arc welding apparatus, a control system is set forth. The plasma arc welding apparatus includes a plasma arc power supply (12), a contactor (20), and an electrode assembly for moving the electrode (32) relative to a work piece (22). The electrode assembly is raised or lowered by a drive motor (24). The present apparatus includes plasma arc adapter (48) connected across the power supply to measure the voltage across the plasma arc. The plasma arc adapter forms a DC output signal input to a differential amplifier (60). A second input (58) is defined by an adjustable resistor (56) connected to a DC voltage supply to enable operator control. The differential amplifier forms an output difference signal provided to an adder circuit (64). The adder circuit then connects with a power amplifier (68) which forms the driving signal for the motor. In addition, the motor connects to a tachometer (70) which forms a feedback signal delivered to the adder to provide damping, thereby avoiding servo loop overshoot.

12 Claims, 2 Drawing Sheets

ARC LENGTH CONTROL FOR PLASMA WELDING

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This particular disclosure is directed to control system for use with plasma welding apparatus. More specifically, plasma welding apparatus incorporating a power supply furnishing power connected to a plasma arc assembly provided with a flow of inert gas is positioned above a work piece. A motor operating through a gear box is mechanically connected to raise and lower the torch containing the assembly above the work piece. This apparatus includes a plasma arc signal converter which measures the voltage across the arc dynamically, converts this into a control signal, applies the control signal to a comparator circuit having an input from a reference source, and the output then is applied to a power amplifier closing a servo control loop to the drive motor. This varies the spacing of the electrode from the work piece to thereby vary the voltage across the arc. This enables regular welding notwithstanding changes in the work piece thickness, and overcomes variations in the plasma arc voltage. Damping is accomplished with a tachometer providing a feedback signal to reduce overshoot.

BACKGROUND ART

Prior Art related to this disclosure includes U.S. Pat. Nos. 4,170,727 (Wilkins); 4,324,971 (Frappier); and 4,017,707 (Brown et al). Generally, Wilkins discloses a thermal torch height acquisition circuit having an DC arc length control to vary the arc motor speed. The measured variable is the voltage between the torch and the work piece, which increases as the torch is moved closer to the work piece. This voltage is compared with a selected reference voltage from which torch height control is determined. The motor is operated to raise or lower the torch as a result of the comparison. Brown sets out a plasma arc torch control system. The voltage between the work piece and torch is sensed and a signal representative of the difference between the sensed voltage and an adjustable reference is then created. A motor cooperative with a power supply is used to move the torch relative to the work piece. Frappier is a torch height acquisition system having a current sensitive relay in the arc supply circuit. The relay has normally closed contacts connected in the motor drive power supply circuit. The relay contacts are opened after main arc ignition has been sensed.

BACKGROUND OF THE PRESENT DISCLOSURE

The present disclosure is an apparatus for control of arc length in plasma welding. A plasma welding system includes a power supply for sustaining the plasma welding arc. It has two output terminals, one terminal of which is connected to the tungsten electrode shielded by a metallic sleeve. A flow of inert gas is directed down through the metallic sleeve and emerges around the tip of the electrode to form an oxygen free immediate atmosphere at the weld point on the work piece. This entire assembly is moved by a motor connected through a gear box to raise or lower the entire assembly relative to the work piece. There is a second conductor connected to the metallic sleeve which includes a limiting resistor. This second conductor defines a return current path so that a pilot arc can be struck between the electrode and the sleeve. The pilot arc serves as a starter and is extinguished after current begins to flow between the electrode and the work piece. This occurs when a contactor circuit between the power supply and work piece operates to complete a low resistance current flow path. When that occurs, the pilot arc is extinguished as the main arc is initiated.

In general terms, arc length is more or less proportional to the voltage drop across the arc. It is desirable that a particular arc length be established as a result of a particular voltage. However, this length may vary as a result of several parameters in operation of the system, and common variations arise from changes in the work piece geometry. As an example, the work piece can change in thickness, contour and other factors which dictate changes in the arc length. At this juncture, it is desirable to adjust the spacing between the tip and work piece so that the desired arc length is dynamically achieved, thereby establishing the desired voltage. If this is done in timely fashion, quality of the bead formed by the plasma arc welding process is markedly improved. It is ideal that controlled spacing be acomplished automatically. Automatic operation then permits the present apparatus to be installed and operated in a continuous fashion. As an example, the entire arc welding apparatus can be moved relative to a large work piece by means of a pantograph or the like. Positioning of the electrode assembly relative to the work piece (controlling arch length) is achieved in all dimensions by other means. Such means are exemplified by a pantograph or other tracing instrument which controls positioning of the electrode assembly over the work piece. The work piece spacing from the electrode assembly is important to the quality of the arc and hence the quality of the weld made by the apparatus. The present apparatus achieves proper welding arc length by incorporating a servo control loop.

The servo control loop is connected to the output terminals of the plasma arc power supply. At the time that the pilot arc is initiated by a high frequency spark gap oscillator, the spark gap oscillator generates a wide spectrum of noisy signals. The present apparatus utilizes a high frequency blocking filter to prevent the broad spectrum AC noise from feeding through. It incorporates a system which detects the power supply voltage. This voltage is then converted to a different form primarily by rectification and filtering to a DC voltage and is then applied to a comparator circuit. The comparator circuit is furnished with an input reference voltage. This permits the operator to set the desired arc length. The comparator circuit connects to an output power amplifier which in turn operates a drive motor. The drive motor is connected through a gear box to the electrode assembly to raise and lower the electrode assembly. A signal from the feedback loop controls positioning of the electrode assembly and thereby controls arc length. The feedback loop is enhanced by incorporating a tachometer connected to the motor, the tachometer signal being used to damp operation of the feedback controlled motor to avoid overshooting. Critical system damping reduces servo loop overshoot.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention admits to many other equally effective embodiments.

DETAILED DESCRIPTION OF THE PREFERRED EMBODIMENT

Figure 1:
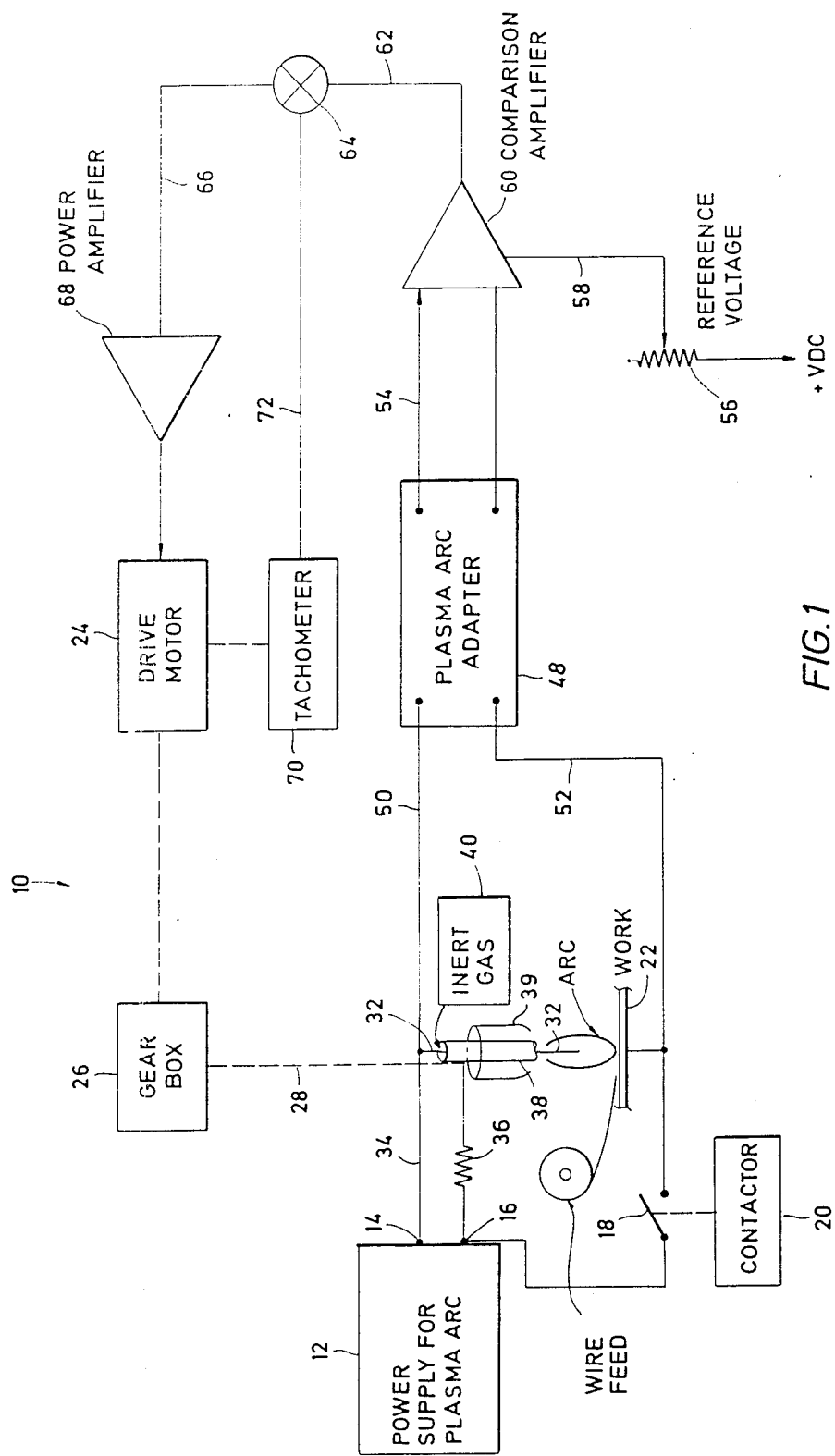
FIG. 1 is a block diagram of the system of the present invention disclosing a servo control system for measuring the voltage across the plasma arc and including means for cntrolling a drive motor which varies the position of the electrode assembly to thereby alter voltage dropped across the plasma arc.

Attention is first directed to FIG. 1 of the drawing where the numeral 10 identifies a plasma arc system constructed in accordance with the teachings of the present disclosure. The description will begin primarily with the apparatus involved in the plasma arc welding apparatus and will then focus on the apparatus incorporated for control of position, above the work piece, thereby controlling the length of the plasma arc. For purposes of this description, it will be assumed that the plasma arc is welding an irregular work piece so that demands on the plasma arc vary, thereby changing arc length and thereby tending to change the nature of the weld. The present invention provides continuous control so that the plasma arc weld can be controlled to yield a high quality bead.

In FIG. 1 of the drawings, a power supply 12 is provided with output terminals 14 and 16. In general terms, the power supply 12 has an output voltage which is typically about 80 volts at open circuit. The voltage typically drops because the device functions as a constant current source. The current can range upwards of several hundred amperes during operation. Typical example might be a current demand of 125 amps to weld a piece of ⅛" stock, while the current might be as high as 300 amps to weld ½" stock. Moreover, the output is termed as AC output but in fact it is not a conventional sine wave; rather, it is more on the order of a pulsed or clipped current, typically being unequal in the two half cycles. A typical cycle is 180 millisecond staight polarity half cycle with a 30 millisecond reverse polarity pulse. This provides a cycle time of 210 milliseconds; since frequency is defined as the reciprocal of cycle duraction, frequency can be calculated. These are representative values and certainly can vary depending on requirements and may also vary from model to model of power supply.

The output from the terminal 16 is connected through a set of switch contacts 18 which are controlled by the contactor 20. For welding, the switch contacts are closed to complete a circuit between the power supply 12 and the work piece. In this example and for ease of description, the work piece can be any regular or irregular shaped piece of metal of variable size, shape and thickness and can be composed of various types of metals including a variety of alloys. The work piece is identified by the numeral 22 in FIG. 1. The work piece is located below what will be termed the electrode assembly. The electrode assembly incorporaes an overhead structure. Typically, the work piece is placed on a table (not shown for sake of clarity) with the electrode assembly thereabove. The electrode assembly includes a drive motor 24. The drive motor is connected to a gear box 26 which in turn mechanically couples to the electrode assembly, this coupled connection being indicated by the dotted line at 28. The electrode assembly includes a tungsten electrode 32 which forms the arc between the electrode 32 and the work piece 22. A conductor 34 is connected from the power supply terminal 14 and the electrode 32. A second conductor connects from the terminal 16 through a limiting resistor 36. The resistor 36 is between the output terminal 16 and the electrode assembly 38. The electrode assembly 38 is part of the structure which surrounds the electrode 32. A suitable saource of inert gas 40 is connected to deliver a flow of gas through the electrode assembly 38, surrounding the electrode, flowing around the tip of the electrode and thereby providing an inert gas for ionization of the plasma arc. A second inert gas provides shielding of the arc by flowing through cup 39. This inert gas thus assures proper metal compounding and formation of the desired alloys in the plasma arc.

In ordinary operation, the system as described at this juncture starts welding by forming a pilot arc. This arc is formed in the electrode assembly between the electrode 32 and metallic sleeve 38. This pilot arc current return is through the limiting resistor 36. This resistor is sized to assure that the pilot arc is sustained and yet is not excessive, thereby avoiding damage to the apparatus. The pilot arc is first started in advance of striking the plasma arc between the electrode 32 and the work piece 22. Ordinarily, the drive motor 24 is operated to change the spacing of the electrode 32, moving it closer to the work piece. The contactor 20 is operated to control the switch 18, thereby completing the return circuit. When the main arc is struck, the pilot arc is extinguished because the limiting resistor 36 is much larger than the effective resistance found in the plasma arc, causing current flow to proceed from the terminal 14 through the switch 18 to assure that the main arc is sustained. At this point, welding can begin and continue. It will be recognized that the arc between the electrode 32 and the work piece 22 is sustained so long as current flow is maintained, the electrode 32 is positioned at the proper spacing, and the inert gas flow 40 continues. As will be understood, this process sets forth the mode of operation which is markedly improved in performance by the servo loop to be described.

The numeral 48 identifies a plasma arc adapter. One input is from a conductor 50, and the conductor 52 serves as the return path to the work or ground. They are connected to measure the arc voltage across the arc. Recall that the plasma arc voltage is dependent on arc length. If arc length can be controlled, then the voltage can be controlled and the quality of the weld is made more uniform. This however cannot always be achieved because conditions may vary, one example being a change in thickness of the work piece. While the power supply 12 sustains a constant current, a change in arc length will change arc voltage. In the present instance, voltage variations are observed by the servo loop (to be described) which provides control signals to assure proper positioning of the electrode assembly. To this end, the description of FIG. 1 will continue. The plasma arc adapter 48 thus observes the AC voltage across the plasma arc. The varable signal is converted to an output signal which is a DC voltage level provided over the conductor 54. A resistor 56 connected to a suitable positive DC voltage serves as a reference voltage source. The reference voltage is selected by the operator. The reference voltage is input by the conductor 58 to a differential amplifier 60. The amplifier 60 compares the reference voltage to the DC signal voltage. Such comparison is made by subtracting one from the other. A differential output signal is then formed on the conductor 62. This signal is provided to an adder circuit 64. The adder circuit provides a sum output on a conductor 66 to a power amplifier 68. The power amplifier 68 provides a control or driving voltage for the drive motor 24. A feedback tachometer 70 is responsive to the drive motor. It forms an output signal (positive for movement in one direction and negative for movement in the opposite) which is delivered over the connector 72 to the adder 64. This signal is summed by the adder 64 so that damping is obtained. Abn example of operation will be given hereinafter. However, it is perhaps expedient to next look to the schematic of the plasma arc adapter 48 shown in FIG. 2 of the drawings.

Figure 2:
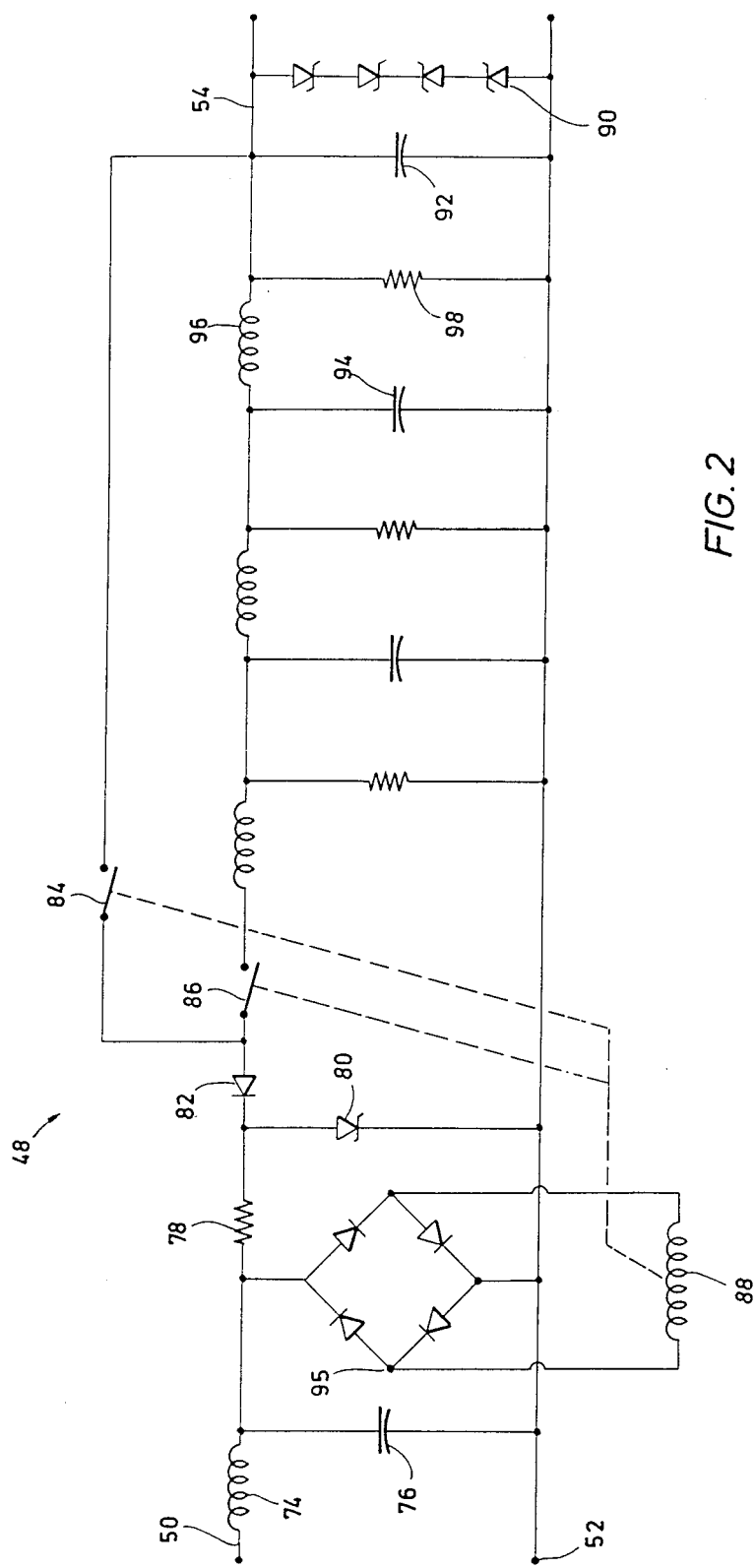
FIG. 2 is a detailed schematic diagram of the plasma arc adapter shown in FIG. 1 which adapter forms a control signal for use in the servo loop.

The circuit of FIG. 2 is a floating system; a coil 74 in conjunction with a capacitor 76 serves as an LC filter. The pilot arc initiated by a high frquency spark gap oscillator, typically provides a spectrum of noise with a frequency as high as one megahertz. This signal is blocked by the LC circuit, a high frequency AC reject circuit. The input is a low frquency pulsating, non-symmetrical AC signal. It is delivered to the plasma arc adapter circuitry (ignoring the bridge for a moment) through current limiting resistor 78. A Zener diode 80 is returned to provide controlled voltage levels on the positive peak, while a rectifying diode 82 provides half-wire rectification of the straight polarity signal only. There are two mutually exclusive signal paths. One signal path is a switch 84 while the second signal path is through the switch 86. the two switches are out of phase with one another. They are operated so that they can switch in and out certain filtering sections as will be described. These two switches are subject to control of a coil 88. The coil 88 and the switches comprises a relay. This relay is provided with a voltage level enabling the relay to close at about 50 volts and sustain the closed condition thereafter. The relay is chosen to drop out at about 35 volts. These are scale factors which can be varied as required. The relay coil 88 is driven by a full wave rectified current from the input signal by a four diode bridge rectifier 95. The bridge rectifier converts the input signal from pulsating AC into a suitable DC voltage for operation of the relay. Relay operation of the remainder of the circuitry adds or deletes selected filter circuits as will be described.

The output of the system is at the conducotr 54. The conductor 54 voltage is protected by a set of back-to-back Zener diodes 90. This set of diodes limits the excursion of the output voltage. Moreover, the output voltage is a DC signal with remaining AC components filtered by an output capacitor 92. The output signal however, is selectively filtered by a series of one or more filter sections. In the particular embodiment, three filter sections are shown; as will be understood the number can be varied depending on requirements. Since the filter sections are identical, a description of only one should suffice. Each filter section thus includes an AC shunt capacitor 94 and a series inductor 96. This tends to block any AC components. A shunt resistor 98 is also included.

Operation of the plasma arc adapter 48 should be considered. The pilot arc is initiated by high frequency spark gap oscillator which develops wide spectrum of AC. This AC is blocked by the LC circuit at the input. During maintenance of the regular arc, the input signal is passed by the LC circuit which excludes AC components which are much higher in frequency. This input signal is rectified by the bridge 95 to operate the relay coil 88. This relay controls the switchs 84 and 86, two pair of contacts on the relay. When the plasma arc voltage is low, the switch 84 is normally open. The plasma arc voltage changes such that the switch 84 is opened while the swtich 86 is closed. This switching requires that the signal pass through the multiple filter sections. The filter sections connected in the circuitry by the switch 86 are provided with the half-wave rectified signal from the diode 82. This signal is smoothed and filtered by the multiple sections of filtering and thus provides a DC output signal on the conductor 54 substantially free of AC components. When the relay senses a voltage of above about 50 volts, the switches are reversed, and this provides unfiltered high voltage to the output conductor 54. This output is still smoothed somewhat by the incorporation of the AC capacitor 92, and larger excursions are limited by the back-to-back Zener diodes 90.

The plasma arc adapter 48 ordinarily operates with the signal passing through the multiple sections of filtering. That is, the switch 84 is open, while the switch 86 is closed. This forms an output (a DC level) then provided to the comparator 60 shown in FIG. 1. The reference voltage is selected by the operator. This is input to the comparator. The comparator forms a null output signal when a comparison is obtained. When this occurs, there is no driving signal for the drivng motor 24, and the electrode assembly is held in a fixed location. When there is a driving signal, it can be positive or negative depending on whether or not the voltage across the plasma arc is larger or smaller than desired. In either case, a DC signal on the conductor 54 is provided to the comparator 60. The DC voltage is compared with the reference voltage and a positive or negative signal is output on the conductor 62. This drives the motor 24 in the appropriate direction to restore the arc length to the desired length. As the arc length changes, voltage across the arc changes and this change is sensed in the servo loop. As will be understood, the servo loop can overdrive, formatting overshoot, and perhaps become unstable. This is prevented by incorporating the tachometer 70. It forms a tachometer signal which is of such a polarity applied to the adder 64 that overshoot is damped.

Consider an example. Assume that a large positive driving signal is formed by the comparator 60. This is applied to the drive motor 24 which rapidly forms a relatively large signal adds through the adder 64, motor speed is increased. However, as the desired location is approached, the output from the comparator circuit 60 starts dropping. As it drops, the motor then slows before the ultimate position required for that circumstance is achieved. As the motor slows the tachometer slows and hence the control loop anticipates the ultimate position, slowing the motor 30 24 so that it arrives at the desired position for the electrode assembly without overshooting. Servo loop control is particularly helpful to sustain a quality plasma arc weld. This enables the device in operation to overcome variations in work piece contours, thickness and other variables which would otherwise require 35 variations in plasma arc.

The foregoing makes clear the mode of operation of the present apparatus. The procedure that is implemented by means of the servo loop is carried out continuously with the apparatus always seeking a plasma arc of controlled length, this being determined by the reference voltage from the resistor 56. This length is first defined by the operator and is sutaned during operation. Moreover, the apparatus provides continuous monitoring of plasma arc length so that the power supply voltage is proper to sustain such a plasma arc length.

While the foregoing is directed to the preferred embodiment, the scope thereof is determined by the claims which follow.

I claim:

1. For use with a variable polarity plasma arc welding apparatus having a plasma arc power supply connected to a movable electrode assembly above a work piece and including a motor for moving the electrode assembly, a control apparatus comprising plasma arc power supply voltage measuring means connected in a servo loop incorporating the motor wherein said voltage measuring means includes a variable polarity AC to DC adapter employing half wave rectification of the AC voltage across the arc, and wherein said voltage measuring means forms a control voltage dependent on plasma arc length for operation of the motor.

2. The apparatus of claim 1 wherein said voltage measuring means includes filter means excluding the output signal of the power supply when a pilot arc is formed by the electrode assembly.

3. The apparatus of claim 1 wherein said voltage measuring means has input terminals adapted to be connected across the power supply for the plasma arc and wherein said voltage measuring means forms a controlled output DC voltage.

4. The apparatus of claim 3 including voltage comparator means having two inputs, one connected to said voltage measuring means to obtain the voltage control signal therefrom, and also including a reference voltage input adjustable in a specified range.

5. The apparatus of claim 4 wherein said comparator means forms an output signal indicative of the difference of the two inputs provided thereto.

6. The apparatus of claim 5 further including a power amplifier connected to said comparator means, said power amplifier forming a power output signal for operation of the motor.

7. The apparatus of claim 6 wherein said motor is able to operate in two directions to raise and lower the electrode assembly, and wherein said power amplifier provides a signal thereto capable of driving the motor in a selected direction.

8. The apparatus of claim 1 wherein said voltage measuring means has a pair of input terminals adapted to be connected across the power supply, and the power supply forms an AC signal; said voltage measuring means further including means for sensing the input signal to determine whether or not the input signal exceeds a specified range associated withplasma arc welding wherein the excessive range is indicative that plasma arc welding has not initiated.

9. The apparatus of claim 1 wherein siad voltage measuring means includes rectifier means for converting the input thereto into a DC signal, filter means for reducing AC signal components in the DC signal, and means connected to the output thereof for permitting excursion of the output between specified limits.

10. The apparatus of claim 1 wherein the motor connects with a tachometer forming an output signal, the output signal being positive or negative depending on the direction of rotation of the motor, and wherein said servo loop includes adder means provided with the signal from said tachometer and a signal derived from said voltage measuring means.

11. The apparatus of claim 10 wherein the said adder means provides an output connected with a power amplifier for forming a driving signal for the motor.

12. The apparatus of claim 11 wherein said adder is provided with a signal from said voltage measuring means through a comparator means, said comparator means having two inputs, and reference voltage means connected to one input of said comparator means.

* * * * *